United States Patent [19]

David

[11] Patent Number: 5,604,385
[45] Date of Patent: Feb. 18, 1997

[54] APPARATUS FOR AND METHOD OF EVENLY DISTRIBUTING AN ELECTRICAL LOAD ACROSS A THREE PHASE POWER DISTRIBUTION NETWORK

[75] Inventor: Yair David, Ramat Hasharon, Israel

[73] Assignee: Target Hi-Tech Electronics Ltd., Nejanya, Israel

[21] Appl. No.: 446,968

[22] Filed: May 22, 1995

[51] Int. Cl.[6] ...................................... H02J 1/10
[52] U.S. Cl. .................. 307/52; 307/18; 307/29; 307/38
[58] Field of Search ...................... 307/11, 18, 19, 307/23, 24, 29, 31–39, 52, 80, 85–87, 125, 129, 131; 364/480, 492, 493; 363/9

[56] References Cited

U.S. PATENT DOCUMENTS

| | | | |
|---|---|---|---|
| 3,991,359 | 11/1976 | Thompson et al. | 323/4 |
| 4,659,942 | 4/1987 | Volp | 307/19 |
| 5,182,464 | 1/1993 | Woodworth et al. | 307/87 |
| 5,191,520 | 3/1993 | Eckersley | 363/72 |
| 5,477,091 | 12/1995 | Fiorina et al. | 307/66 |

Primary Examiner—William M. Shoop, Jr.
Assistant Examiner—Jonathan S. Kaplan
Attorney, Agent, or Firm—Mark M. Friedman

[57] ABSTRACT

An apparatus for and method of evenly distributing an electrical load across a three phase power distribution network. The current in each incoming phase and in each branch circuit is measured by a plurality of current sensors. The output of the current sensors are monitored by a processor. Associated with each branch circuit is a multipole switch and a conventional circuit breaker. Each switch is able to connect its corresponding branch circuit to any incoming phase or to disconnect the branch circuit from all three phases. The processor periodically monitors the current flowing through each incoming phase and based on branch circuit load conditions, reprograms the switches to keep the branch circuit loads evenly distributed across all three incoming phases. In another embodiment, a summing circuit combines the current capacities of all three incoming phases into a single summed output. This output is subsequently rectified and used to generate a single phase AC voltage which feeds all branch circuits in the system.

6 Claims, 2 Drawing Sheets

APPARATUS FOR AND METHOD OF EVENLY DISTRIBUTING AN ELECTRICAL LOAD ACROSS A THREE PHASE POWER DISTRIBUTION NETWORK

FIELD AND BACKGROUND OF THE INVENTION

The present invention relates to an apparatus for and method of evenly distributing the electrical load in a three phase electrical power distribution network.

Presently, many residential homes and commercial facilities receive, at their service entrances, all three phases in a three phase electrical power distribution network provided by an electric utility or power company. In a typical three phase distribution environment each phase supplies one or more branch circuits. The determination of which branch circuit or circuits to wire to each of the three incoming phases is usually made at the time the facility is designed or constructed and is difficult to change once the facility is completed. For example, in a residential facility, different branch circuits might supply the kitchen, living room, bedrooms, etc. with electricity. In a commercial environment, different branch circuits might supply machinery, offices, etc. A problem that arises frequently is how to evenly distribute electrical power across from the three incoming phases, supplied by the electric utility, to all branch circuits. Often, over time, the load topology of a facility will change, sometimes drastically. Some branch circuits become more heavily loaded and others less heavily loaded, due to, for example, movement of machinery on a factory floor, the addition of or movement of high wattage appliances (i.e. refrigerator, electric stove, microwave oven, etc.) in a home. Thus, the load on each of the three incoming phases will also change with the changing load on the branch circuits. A three phase network that was evenly balanced initially might become unbalanced over time.

One solution to this problem is to reassign each branch circuit to an incoming phase to achieve an even load across all three phases by physically rewiring each branch circuit. A disadvantage of this solution is that it potentially requires the costly rewiring of electrical closets and distribution panels every time the three phases become unbalanced, which might occur frequently. Another disadvantage is that the rewiring typically requires a disruption in power causing a potential problem for utility customers. In addition, this solution only provides a crude mechanism of balancing the load across the three incoming phases. It does not track power consumption on each phase and branch circuit on a frequent basis. The hour to hour and minute to minute changes in electrical loading that occur, which might be large enough to cause major unbalancing across the three incoming phases, pass undetected.

SUMMARY OF THE INVENTION

The present invention provides an apparatus for and a method of evenly distributing the electrical load across all three phases of a three phase power distribution network that overcomes the disadvantages of previous solutions.

According to the teachings of the present invention, there is provided a three phase load distribution system comprising a first, second and third current sensor coupled to a first, second and third phase, respectively, of a three phase electrical power distribution network, the first, second and third current sensors for measuring the electrical current flow through the first, second and third phase, respectively, a plurality of switches, each switch coupled to one of a plurality of branch circuits, each of the plurality of switches for connecting any one of the first, second or third phases to one of a plurality of branch circuits, a plurality of current sensors, each current sensor coupled to one of the plurality of branch circuits, the plurality of current sensors for measuring the electrical current flow through each of the plurality of branch circuits and a processor coupled to the first, second and third current sensors, the plurality of switches and the plurality of current sensors, the processor for controlling the plurality of switches so that the electrical current flow through the first, second and third phases do not exceed a predetermined threshold.

BRIEF DESCRIPTION OF THE DRAWINGS

The invention is herein described, by way of example only, with reference to the accompanying drawings, wherein.

DESCRIPTION OF THE PREFERRED EMBODIMENT

The principles and operation of the present invention may be better understood with reference to the drawings and the accompanying description.

Figure 1:
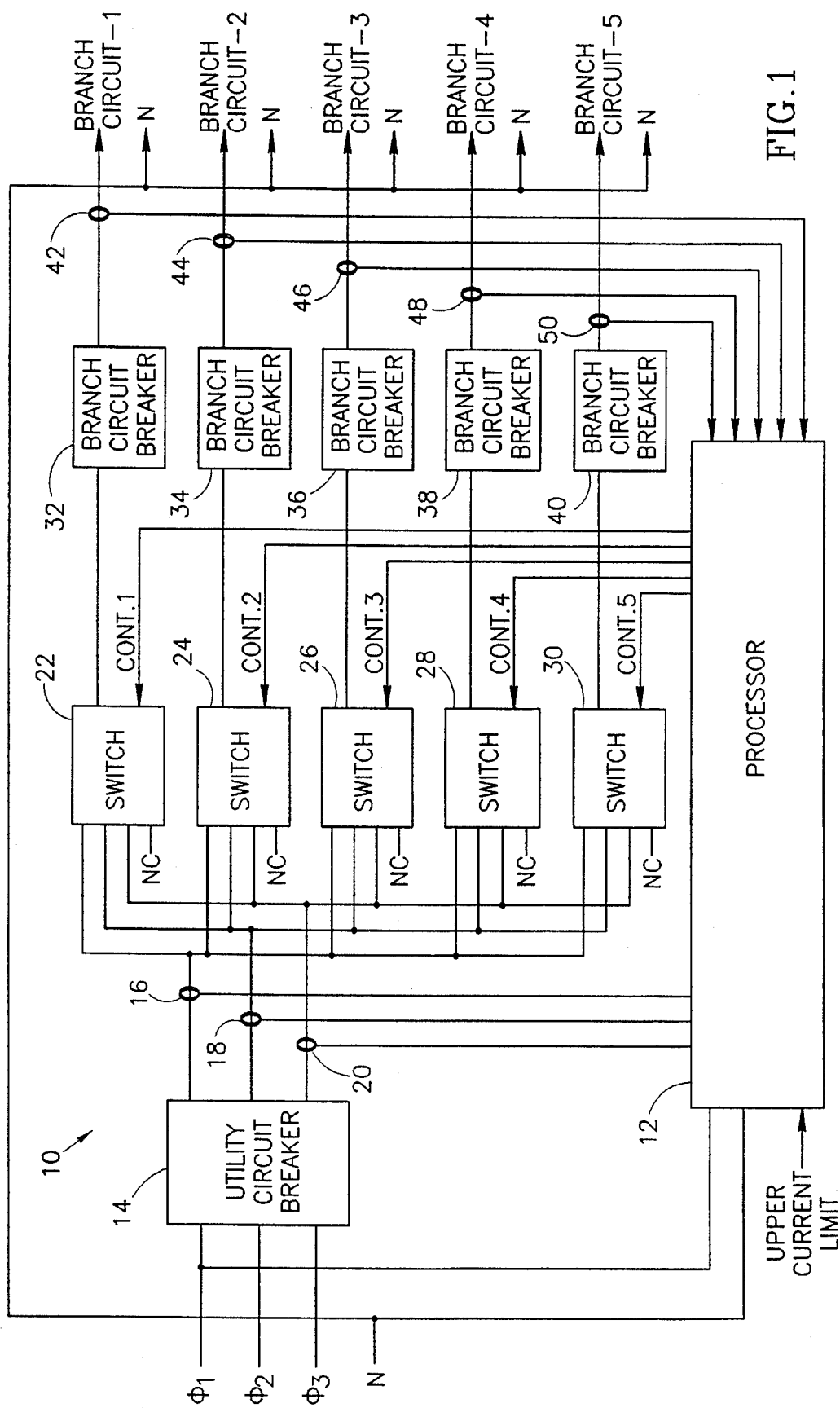
FIG. 1 is a block diagram of an embodiment of the present invention.

A block diagram of a device 10 embodying the present invention is shown in FIG. 1. Three phase electrical power, represented by $\phi 1$, $\phi 2$, $\phi 3$, is supplied by an electric power utility. Phases $\phi 1$, $\phi 2$, $\phi 3$ are over current protected by a utility circuit breaker 14. The output of utility circuit breaker 14 appears at the service entrance to a residence or commercial facility. Current sensors 16, 18, 20 measure the current flowing through phases $\phi 1$, $\phi 2$, $\phi 3$, respectively. The output of current sensors 16, 18, 20 are monitored by a processor 12. Processor 12 can be any suitable computing device such as a microprocessor, microcontroller, personal computer, etc.

Each of the three phases output from utility circuit breaker 14 are input to an array of multi-pole switches 22, 24, 26, 28, 30. Each switch has four input terminals. Three terminals are provided, one each for each of the three incoming phases. In addition, a forth terminal is provided that is a no connection terminal (i.e. not connected to anything). The output of switches 22, 24, 26, 28, 30 are input to an array of branch circuit breakers 32, 34, 36, 38, 40, respectively. Control signals CONT1, CONT2, CONT3, CONT4, CONT5, output from processor 12, determine the position of switches 22, 24, 26, 28, 30, respectively. The output of branch circuit breakers 32, 34, 36, 38, 40 pass through an array of current sensors 42, 44, 46, 48, 50, respectively, before supplying each of the five branch circuits with power. Each of the five branch circuits has a neutral line N associated with it. The current measured by current sensors 42, 44, 46, 48, 50 is monitored by processor 12.

Operation of device 10 centers around multi-pole switches 22, 24, 26, 28, 30. In the application of device 10, each branch circuit to be covered has associated with it a switch, a branch circuit breaker and a current sensor. Shown in FIG. 1 is a load balancing system covering five branch circuits. The present invention, however, could easily be made to cover any number of branch circuits, simply by providing sufficient components.

On a periodic basis, processor 12 acquires the output of current sensors 16, 18, 20, which measure the current flowing though each phase of the supplied three phase power. Processor 12 also monitors the output of current sensors 42, 44, 46, 48, 50, which measure the current flowing through each branch circuit. The time between successive acquisitions of current sensor data is on the order of milliseconds or tens of milliseconds and is a function of the software controlling processor 12. The data acquired during each data acquisition cycle is not immediately discarded. A finite number of the most recent sets of acquired data are kept in memory, which may be either internal or external to processor 12.

Processor 12 is suitably programmed to periodically acquire data from all current sensors in order to be able to track the load on each phase of the incoming three phase power and on each branch circuit. When the measured current on any one phase exceeds a fixed percentage (e.g., 90%) of an upper current limit setting, processor 12 programs switches 22, 24, 26, 28, 30 so that the total load is fairly equal across the three incoming phases. Since the load on each branch circuit is known, processor 12 can redistribute the branch loads so that the load on each phase is approximately equal. Once the new switch settings are determined, processor 12 outputs switch repositioning commands over control lines CONT1, CONT2, CONT3, CONT4, CONT5 to switches 22, 24, 26, 28, 30, respectively.

During operation of device 10, it is possible that the load on a single branch circuit increases to a level that exceeds the maximum permitted branch current. In response to this possible over current condition, processor 12 can program the branch circuit's corresponding switch to its no connection position. In this position, the branch circuit is electrically disconnected from all three incoming phases. In addition to the over load protection provided by processor 12, conventional branch circuit breakers 32, 34, 36, 38, 40 also provide over current protection for each branch circuit. Device 10 is also able to provide a function conventional circuit breakers are currently not able to provide. Processor 12 can be suitably programmed to predict potential overload conditions before they occur by monitoring the rate of rise in current use by each branch circuit and by each incoming phase. Thus, potential disruptions in power due to exceeding current limits on an incoming phase can be anticipated and avoided before they occur.

Switches 22, 24, 26, 28, 30 may utilize relays or semiconductor switches (i.e. triacs, silicon controlled rectifiers, etc) as their core switching elements. Each switch decodes its corresponding control signal, received from processor 12, and either connects its output to one of the three incoming phases or totally disconnects its output from all three phases. Switches 22, 24, 26, 28, 30 can switch their output terminals to any incoming phase fast enough so that devices or equipment connected to their corresponding branch circuit do not see any appreciable gap in supplied power and thus, are not adversely effected.

Processor 12 derives its power from φ1 and the neutral line N of the incoming three phase power. Processor 12 can, however, derive power from any of the three incoming phases. The upper current limit setting can be input to processor 12 any number of ways, all well known in the art. For example, the upper current limit data could be hard coded in a read only memory device, supplied by external dip switch settings, supplied by an external computing device, etc.

Figure 2:
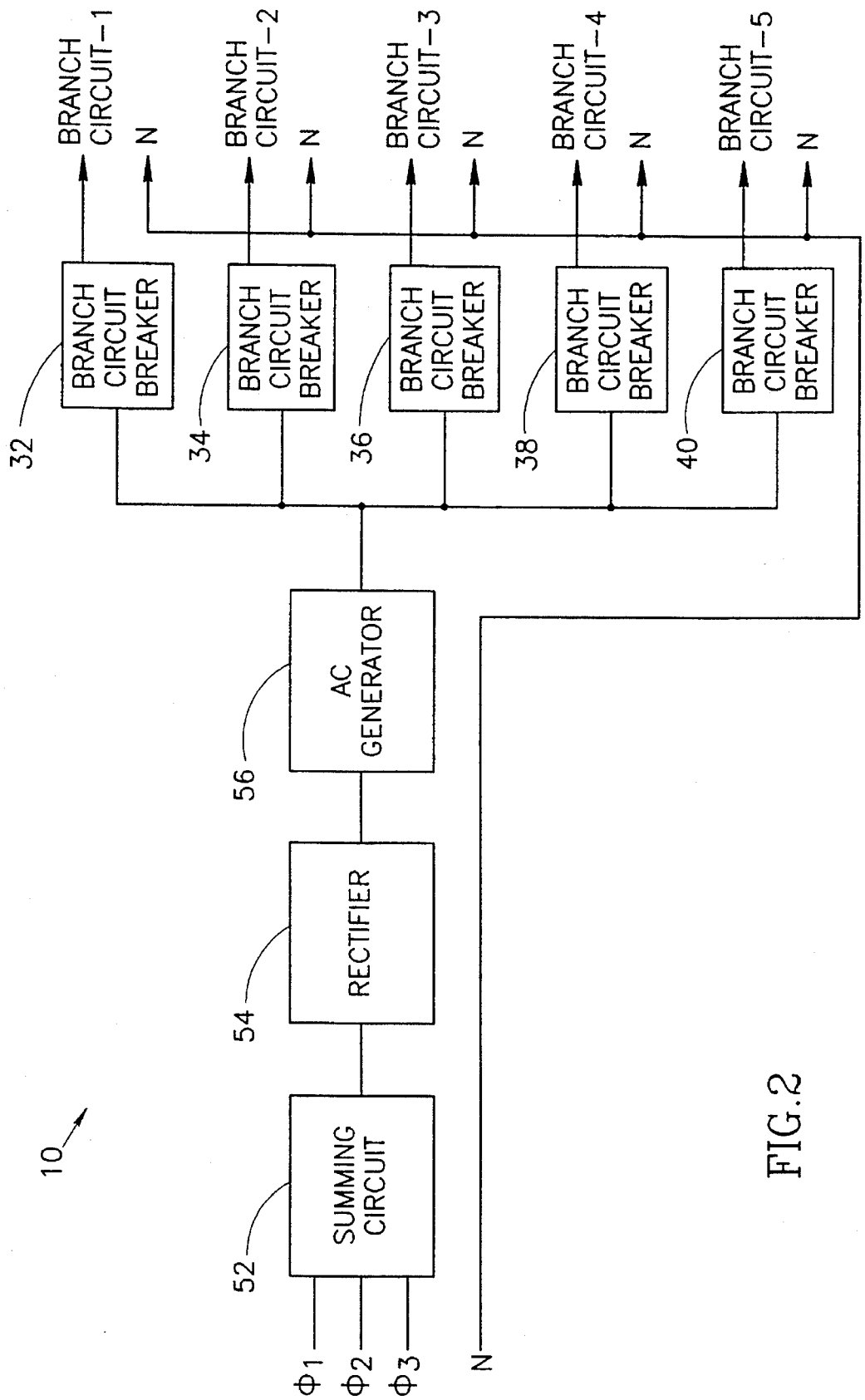
FIG. 2 is a block diagram of an embodiment of the present invention.

A second embodiment of the present invention, shown in FIG. 2, functions to evenly distribute the load across each phase of a three phase power distribution network. Each phase, φ1, φ2, φ3, of a three phase power distribution network is input to an electrical power summing circuit 52. Summing circuit 52 functions to receive each incoming phase and combine its current and power handling capacity and subsequently form a single summed output. The output from summing circuit 52 is a single AC electrical voltage having a current capability approximately equal to the sum of the current capabilities of the three incoming phases.

The output of summing circuit 52 is subsequently input to a rectifier 54. Rectifier 54 rectifies the AC output of summing circuit 54 to essentially a DC level. The current carrying capability of rectifier 54 must be sufficient to handle the total current needs of all the branch circuits combined that are to be covered by device 10.

The output of rectifier 54 is input to an AC generator 56. AC generator 56 produces a single phase AC voltage from the DC voltage output by rectifier 54. The appropriate voltage and frequency (e.g., 120 V, 60 Hz for the United States) is generated for the particular locality device 10 must operate in.

The output of AC generator 56 is input to branch circuit breakers 32, 34, 36, 38, 40, covered by device 10. The branch circuits are supplied with power by the output of branch circuit breakers 32, 34, 36, 38, 40. Although five branch circuits are shown in FIG. 2, any number of branches can be covered by device 10, provided the components have sufficient current ratings for the combined load of all branch circuits.

The actual load distribution in device 10 occurs in summing circuit 52. No matter how the load on each branch circuit increases or decreases it is automatically distributed evenly across all three incoming phases. For example, if the load on any one branch or a group of branches increases by 30%, the corresponding load on each incoming phase increases 10%. Since each incoming phase can be represented by an equivalent low impedance source of current that are identical to each other, if the load on summing circuit 52 increases 30% then this increase appears equally across each of the three incoming phases.

The advantage of this second embodiment over the first embodiment, is that it is less complex, however, it is possibly more costly because expensive components must be utilized for summing circuit 52, rectifier 54 and AC generator 56 that are capable of handling the increased levels of current.

While the invention has been described with respect to a limited number of embodiments, it will be appreciated that many variations, modifications and other applications of the invention may be made.

What is claimed is:

1. A three phase load distribution system for evenly distributing an electrical load, present on a plurality of branch circuits, across a three phase power distribution network, comprising:

a first, second and third current sensor coupled to a first, second and third phase, respectively, of the three phase electrical power distribution network, said first, second and third current sensors for measuring electrical currents flowing through said first, second and third phase, respectively;

a plurality of switches, each of said switches coupled to one of the plurality of branch circuits, each of said plurality of switches for connecting any one of said first, second or third phases to one of the plurality of branch circuits;

a plurality of current sensors for measuring electrical currents flowing through each of said plurality of branch circuits; each of said current sensors coupled to one of said plurality of branch circuits; and a processor for controlling said plurality of switches so that said electrical currents flowing through each of said first, second and third phases does not exceed a predetermined threshold; said processor coupled to said first, second and third current sensors, said plurality of switches and said plurality of current sensors.

2. The system of claim 1, wherein each of said plurality of switches includes at least one semiconductor switch.

3. The system of claim 1, wherein each of said plurality of switches can electrically disconnect said first, second and third phases from the plurality of branch circuits.

4. A three phase load distribution system for evenly distributing an electrical load, present on a plurality of branch circuits, across a three phase power distribution network, comprising:

a first, second and third current sensor coupled to a first, second and third phase, respectively, of the three phase electrical power distribution network, said first, second and third current sensors for measuring electrical currents flowing through said first, second and third phase, respectively; first, second and third circuit breakers coupled to said first, second and third phases, respectively;

a plurality of switches, each of said switches coupled to one of the plurality of branch circuits, each of said plurality of switches for connecting any one of said first, second or third phases to one of the plurality of branch circuits;

a plurality of circuit breakers, each coupled to one of the plurality of branch circuits;

a plurality of current sensors for measuring electrical currents flowing through each of said plurality of branch circuits; each of said current sensors coupled to one of said plurality of branch circuits; and a processor for controlling said plurality of switches so that said electrical currents flowing through each of said first, second and third phases does not exceed a predetermined threshold; said processor coupled to said first, second and third current sensors, said plurality of switches and said plurality of current sensors.

5. The system of claim 4, wherein each of said plurality of switches includes at least one semiconductor switch.

6. The system of claim 4, wherein each of said plurality of switches can electrically disconnect said first, second and third phases from the plurality of branch circuits.

* * * * *